United States Patent
Tammer et al.

(10) Patent No.: US 7,087,693 B2
(45) Date of Patent: Aug. 8, 2006

(54) POLYMERIZATION PROCESS INVOLVING DIACYL PEROXIDES

(75) Inventors: Marinus Catharinus Tammer, Diepenveen (NL); Johannes Jacobus Theodorus De Jong, Westervoort (NL); Johannes Willibrordus Antonius Overkamp, Lemelerveld (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/503,052

(22) PCT Filed: Feb. 20, 2003

(86) PCT No.: PCT/EP03/01746

§ 371 (c)(1),
(2), (4) Date: Feb. 14, 2005

(87) PCT Pub. No.: WO03/074573

PCT Pub. Date: Sep. 12, 2003

(65) Prior Publication Data

US 2005/0119501 A1 Jun. 2, 2005

(30) Foreign Application Priority Data

Mar. 1, 2002 (EP) .................................. 02075882

(51) Int. Cl.
*C08F 4/32* (2006.01)

(52) U.S. Cl. ...................... 526/231; 526/204; 526/208; 526/209; 526/344

(58) Field of Classification Search .............. 526/231, 526/204, 208, 209, 344
See application file for complete search history.

(56) References Cited

U.S. PATENT DOCUMENTS

| | | | | | |
|---|---|---|---|---|---|
| 2,865,904 | A | * | 12/1958 | Seed et al. ................... | 526/209 |
| 3,019,214 | A | * | 1/1962 | Pajaczkowski .............. | 526/227 |
| 3,502,701 | A | * | 3/1970 | Lewis et al. ................. | 568/566 |
| 3,652,681 | A | * | 3/1972 | Wood .......................... | 568/560 |
| 3,674,855 | A | * | 7/1972 | Van Driel .................... | 568/31 |
| 3,936,506 | A | * | 2/1976 | Berthold ...................... | 568/560 |
| 4,071,677 | A | * | 1/1978 | Wood .......................... | 526/231 |
| 4,155,937 | A | * | 5/1979 | Haas ........................... | 568/425 |

FOREIGN PATENT DOCUMENTS

| JP | 09-183808 | * | 7/1997 |
|---|---|---|---|
| WO | WO 00/17245 | | 3/2000 |
| WO | WO 01/32613 A1 | | 5/2001 |

* cited by examiner

*Primary Examiner*—Johann Richter
*Assistant Examiner*—Chukwuma Nwaonicha
(74) *Attorney, Agent, or Firm*—Oliff & Berridge, PLC

(57) ABSTRACT

The invention relates to a process to make and use specific diacyl peroxides in polymerization reactions. The peroxides are produced and used in a polymerization process within a short timeframe in order to overcome stability issues associated with them.

22 Claims, No Drawings

POLYMERIZATION PROCESS INVOLVING DIACYL PEROXIDES

The present invention relates to a polymerization process wherein at least one diacyl peroxide of formula (I)

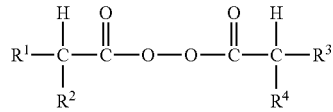

is used as a source of free radicals.

Such processes are known from, for instance, WO 00/17245, where diisobutanoyl peroxide is used to polymerize vinyl chloride by means of the radicals that are formed during the thermal decomposition of the peroxide.

However, the use of diacyl peroxides of formula (I) can be cumbersome. More particularly, the peroxides of formula (I) are very thermally labile, as a result of which they show significant decomposition during storage at temperatures as low as −5° C. In order to ensure the quality and assay of the product, it is typically produced at temperatures of 0° C. or lower and kept at temperatures of −20° C. during its storage and handling. However, even at such low temperatures, a noticeable reduction of the assay of the material is noted. Furthermore, it is necessary to phlegmatize the peroxides of formula (I), particularly the products wherein $R^1$, $R^2$, $R^3$, and $R^4$ contain less than 20 carbon atoms in total, using a water-immiscible, hydrophobic solvent, such as isododecane, because the peroxides cannot be handled in the pure form for safety reasons. Such solvents will end up in the polymer made in the polymerization process, which for a variety of well-known reasons (undesired plasticizing of the polymer, exudation from finished polymer articles, which may lead to fogging, and the like), is typically undesired.

Therefore, there is need for a process wherein peroxides of formula (I) can be used without undesired refrigeration and solvents being obligatory. Preferably, the process also allows the use of water to reduce the safety hazards associated with the diacyl peroxides, so that they can be handled safely during processing and handling/metering to the polymerization reactor.

Surprisingly, we have found that the use of a specific process for making and using the diacyl peroxides of formula (I) fulfills this need.

The process according to the invention is characterized in that an aqueous mixture comprising a peroxide of formula (I) is produced in a peroxidation step wherein
i) one or more acid halides of formula (II)

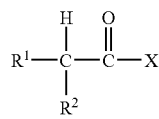

are reacted with
ii) $MOOH/M_2O_2$ and/or one or more peracids (or their salts) of formula (III)

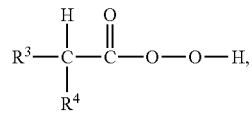

in an aqueous phase, in which peroxidation step the acid halide, or mixture of acid halides, is essentially only brought into contact with water containing $MOOH/M_2O_2$ and/or one or more peracids (or their M salts), to give an aqueous mixture, and
iii) optionally one or more colloids and/or surfactants are combined with said aqueous mixture before, during, or after the peroxidation step and
the resulting aqueous mixture is used in a polymerization process.

It is noted that the term $MOOH/M_2O_2$ stands for the product that is formed from $H_2O_2$ and a suitable source of metal (M) ions. The product typically is not a discrete product $M_2O_2$, but the equilibrium comprising $H_2O_2$, MOOH and $M_2O_2$.

From an industrial point of view it is preferred that the starting material from which the diacyl peroxides of formula (I) are prepared, i.e. the one or more acid halides of formula (II)

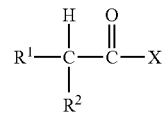

and the one or more peracids (or their M salts) of formula (III)

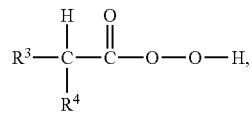

are easily available or obtainable. Most preferably, these compounds are commercially available.

The process of this invention is pre-eminently suitable for diacyl peroxides that are liquid at the process temperature, since these diacyl peroxides have a lower hydrolytic and thermal stability than diacyl peroxides that are solid at the process temperature.

In a preferred embodiment, the aqueous mixture comprising diacyl peroxide of formula (I) is used in the polymerization process within a period of 168, more preferably 102, even more preferably 48, more preferably still 24, yet more preferably 12, yet more preferably still 2 hours after the peroxidation step. In a most preferred embodiment, the reactor wherein the peroxidation step is conducted is directly linked by means of piping and optional further holding or processing tanks to the reactor in which the polymerization process is conducted.

In another preferred embodiment, the diacyl peroxide is stored and handled in this process at temperatures up to 5° C., since it was observed that, depending on the hydrolytic and thermal stability of the diacyl peroxide, it can be acceptable in the process according to the invention to store and handle the diacyl peroxide up to temperatures of −5° C., preferably 0° C. or more preferably 5° C.

In the process of the present invention it is necessary to prevent just water and acid halide of formula (II) from being combined at any given time, since otherwise the acid halide would hydrolyze, resulting in low yields of peroxide and causing contamination of the aqueous mixture. Also, a mixture of just water and acid halide was found to be very corrosive, which would require the use of more expensive process equipment. Hence, when it is stated that in the process the acid halide is essentially only brought into contact with water containing $MOOH/M_2O_2$ and/or one or more peracids, what is meant is that water and just acid halide are contacted for a period of at most 1 minute, preferably at most 20 seconds, more preferably at most 10 seconds, even more preferably at most 5 seconds, most preferably at most 1 second. Therefore, the only viable ways to make diacyl peroxide are: i) to pre-charge water, $MOOH/M_2O_2$ (or, optionally, to make the $MOOH/M_2O_2$ from $H_2O_2$ and a source of M) and dose acid halide thereto, ii) to pre-charge water and $H_2O_2$ and dose both the source of M and acid halide, iii) to pre-charge water and dose both $MOOH/M_2O_2$ (optionally $H_2O_2$ together with a source of M) and acid halide, and iv) to pre-charge water and a source of M and dose both $H_2O_2$ and acid halide. If a peracid is used in the present process, the same viable ways are available (substituting the peracid for $H_2O_2$, and substituting the M salt of the peracid for $MOOH/M_2O_2$). In order to optimize the yield of peroxide, using one of the four viable ways is preferred.

It is noted that U.S. Pat. No. 3,923,766 discloses a so-called "in-situ" process where a diacyl peroxide of formula (I) is used that is produced from an anhydride and a peracid. The "in-situ" process is characterized in that the diacyl peroxide is produced in the polymerization reactor in the presence of the monomer, which is not a process according to the invention. Such "in-situ" processes are undesired, since they do not allow a flexible mode of operation. More particularly, most of the peroxide is formed near the start of the process, preventing a constant polymerization rate, and thus resulting in a heat output that is not constant. Such a variation in heat output is undesired, since polymerization reactors are run most cost-effectively under conditions where cooling is at the maximum rate. To overcome this problem, it is suggested in U.S. Pat. No. 3,923,766 to use a second (conventional) more stable initiator. However, such more stable initiators will partially end up in the final polymer, which is undesired for polymer stability reasons (the remaining initiator will lead to premature decomposition of the resin during heat treatment, such as moulding operations).

U.S. Pat. No. 3,936,506 discloses a method of preparing asymmetrical α-halogen substituted diacyl peroxides of formula (I) wherein $R^2$ is chloride or bromide, $R^4$ is hydrogen, and each of $R^1$ and $R^3$ is a long chain alkyl radical having about 10 to about 16 carbon atoms. It is noted that these α-halogen substituted diacyl peroxides of U.S. Pat. No. 3,936,506 are not of interest for the present invention, since the starting materials from which these diacyl peroxides are to be prepared are not easily available or obtainable. From an industrial point of view this is an undesirable situation.

It is furthermore noted that WO 01/32613 discloses a process where peroxy-dicarbonates are produced ex-situ. However, it is desired to offer alternative processes allowing the production of a broader range of peroxides. More specifically, the peroxydicarbonates of WO 01/32613 all have a half-life of 1 hour at a temperature of about 64° C. This means a rather limited freedom when it comes to selecting the polymerization temperature. Also, the chloroformate used to make the peroxydicarbonates is much more hydrolytically stable than the acid halides that are used to make the diacyl peroxides of the present invention. At lower temperatures (say about 50° C.) the peroxydicarbonates will not decompose fast enough to give efficient polymerization times and lead to an unacceptably high residual peroxide content in the final polymer, which adversely affects the thermal stability of the formed polymer. At higher polymerization temperatures (say about 60° C.) the peroxydicarbonates will decompose too quickly, leading to inefficient use and too slow polymerization rates towards the end of the polymerization. Surprisingly, it was found that, after further modification, the concept of WO 01/32613 could be extended to diacyl peroxides of formula (I). The modification needed is, inter alia, to make sure that the acid halide is not just substituted for the chloroformate, but that it is brought into contact with water only when an inorganic peroxide or peracid (salt) is present in the aqueous phase.

DETAILED DESCRIPTION OF THE INVENTION

The present invention relates to a process comprising the steps of:

producing an aqueous mixture comprising a diacyl peroxide of formula (I)

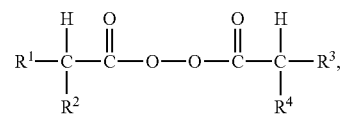

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure, by reacting, in a so-called peroxidation step, one or more acid halides of formula (II)

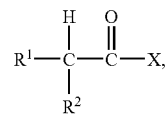

wherein X is halide, preferably chloride or bromide, most preferably chloride, with i) $MOOH/M_2O_2$, wherein M is any metal or ammonium-containing group that will react with $H_2O_2$ to form $MOOH/M_2O_2$ without decomposing one or more of the peroxides present in the process, preferably M is selected from the group consisting of ammonium, sodium, potassium, magnesium, calcium, and lithium, and/or ii) one or more peracids of formula (III)

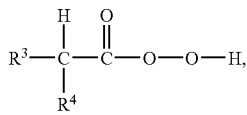

or preferably the M salts thereof, in an aqueous phase, in which process the acid halide, or mixture of acid halides, is essentially only brought into contact with water containing $MOOH/M_2O_2$ and/or one or more peracids (or their peracid salts), preferably $M_2O_2$ or the M salt of the peracid, optionally introducing one or more solvents for the acid halide in any part of the process, optionally introducing one or more salts in any part of the process, optionally introducing one or more colloids and/or surfactants, before, during, or after the peroxidation step, optionally purifying the aqueous mixture in one or more purification steps, optionally homogenizing the aqueous mixture in one or more homogenization steps, transferring the product from the previous steps that comprises the diacyl peroxide of formula (I) to a polymerization reactor, and thermally decomposing said diacyl peroxide, to generate organic free radicals, in the presence of one or more ethylenically unsaturated monomers, to polymerize said monomers in said polymerization reactor.

In a preferred embodiment, the aqueous mixture comprising said diacyl peroxide is used in said polymerization process within a period of 168, more preferably 102, even more preferably 48, more preferably still 24, yet more preferably 12, yet more preferably still 2 hours after said peroxidation step. In a most preferred embodiment, the reactor wherein the peroxidation step is conducted is directly linked by means of piping and optional further holding or processing tanks to the reactor in which the polymerization process is conducted. Preferably, the diacyl peroxide-containing mixture is prepared just prior to when it is needed in the polymerization step. Should the dispersion be stored for any period of time, then it is preferred, from a safety point of view, to keep the dispersion in motion to prevent phase separation. Any conventional agitation can be used, such as a shaft with blades, a system to bubble inert gas through the dispersion, and/or a recirculation pump. If one or more of the optional colloids and/or surfactants are used in the process, then the diacyl peroxide-containing mixture typically is less prone to phase separation, increasing safety margins.

In another preferred embodiment, the diacyl peroxide is stored and handled in this process at temperatures up to 5° C., since it was observed that, depending on the hydrolytic and thermal stability of the peroxide, it can be acceptable to store and handle the peroxide in the process according to the invention up to temperatures of −5° C., preferably 0° C. or more preferably 5° C.

In a further preferred embodiment, the process involves diacyl peroxides of formula (I)

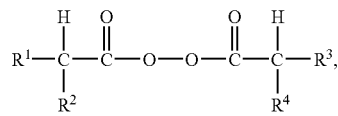

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure, with the further proviso that diacyl peroxides of formula (I) wherein $R^2$ is halogen and $R^4$ is hydrogen, and both $R^1$ and $R^3$ are long chain alkyl groups having about 10 to about 16 carbon atoms, are excluded from this invention.

In yet another preferred embodiment, the process involves diacyl peroxides of formula (I)

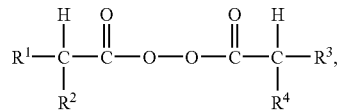

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure, with the further proviso that if $R^2$ is halogen and $R^4$ is hydrogen, and both $R^1$ and $R^3$ are alkyl groups, then each of these alkyl groups has up to about 6 carbon atoms.

In yet another preferred embodiment, the process involves diacyl peroxides of formula (I)

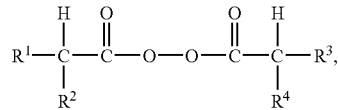

wherein $R^1$–$R^4$ are independently selected from the group consisting of hydrogen and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen; in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure.

In yet another preferred embodiment of this invention, the diacyl peroxide of formula (I), when transferred to the polymerization reactor, is always transferred from the previous step in the aqueous phase, with the diacyl peroxide being represented by formula (I)

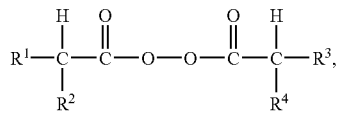

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure.

In one still more preferred embodiment only one reactor is used to produce the diacyl peroxide. Most preferably, only one reactor is used to react both the source of M and $H_2O_2$ and to carry out the peroxidation step to make the diacyl peroxide.

The amount of diacyl peroxide (which acts as an initiator) to be used as a source of free radicals in the polymerization step according to the invention is within the range conventionally used in polymerization processes. Typically, from 0.005 to 2% by weight (% w/w) of initiator, preferably 0.01–1% w/w, more preferably 0.01–0.5% w/w, based on the weight of the ethylenically unsaturated monomer(s) to be polymerized, is used. It is noted that the diacyl peroxide initiator of the present invention may be used in combination with other initiators.

Preferably, the acid halide of formula (II) is derived from $C_1$–$C_{30}$ carboxylic acids, preferably from isobutanoic acid, 2-methylbutanoic acid, 2-methylpentanoic acid, 2-methylhexanoic acid, 2-methylheptanoic acid, octanoic acid, 2-methyloctanoic acid, decanoic acid, 2-methylnonanoic acid, tetradecanoic acid, hexadecanoic acid, octadecanoic acid, lauric acid, 2-ethylbutanoic acid, 2-ethylpentanoic acid, 2-ethylhexanoic acid, 2-ethylheptanoic acid, 2-ethylnonanoic acid, 2-propylcaprylic acid, 2-propylheptanoic acid, 2-propylhexanoic acid, 2-propyloctanoic acid, 2-propylpentanoic acid, 2-propyl-4-pentanoic acid, 2-butylcaproic acid, 2-butyl-heptanoic acid, 2-butyloctanoic acid, (substituted) cyclohexane carboxylic acid, chloroacetic acid, 2-chloropropionic acid, 2-chlorobutanoic acid, 2-chlorohexanoic acid, dichloroacetic acid, propanoyl-$C_{16}$ acid, and aromatic acids such as benzoic acid, 2-chlorobenzoic acid, 3-chlorobenzoic acid, 2-methylbenzoic acid, 3-methylbenzoic acid, 4-methylbenzoic acid, naphtoic acid, and toluic acid. More preferably, at least one of the acid halides is selected from isobutanoyl halide, 2-ethylbutanoyl halide, 2-ethylhexanoyl halide, 2-chloropropanoyl halide, dichloroacetic acid halide, lauroyl halide, cyclohexane carbonyl halide, 3-methylcyclohexane carbonyl halide, 2,3 dihalocyclohexane carbonyl halide, benzoyl halide, 2-methylbenzoyl halide, and 2-chlorobenzoyl halide. If so desired, also the acid halides of polycarboxylic acids, with two or more acid moieties, can be used, such as (cyclo) hexyl dicarboxylic acid, phthalic acid (any isomer), maleic acid, fumaric acid, 1,2,4-butanetricarboxylic acid, (oligomeric) polyacrylic acid, and copolymers with maleic anhydride derivable acid groups. Suitably, a mixture of any of these acid halides is used, typically resulting in a mixture of three or more diacyl peroxides of formula (I), as is known in the art.

If the acid halide of formula (II) is reacted with a peracid of formula (III), or the salt of such a peracid, wherein $R^3$ and $R^4$ are not hydrogen, then also acid halides of formula (II) can be used wherein $R^1$ and/or $R^2$ are hydrogen. Examples of such acid halides include chloroacetic acid halide, chloropropionic acid halides (all isomers), acetyl chloride, propionyl chloride, butanoyl chloride, pentanoyl or valeroyl chloride, decanoyl chloride, lauroyl chloride, malonyl chloride, succinoyl chloride, glutaroyl chloride, adipoyl chloride, azeloyl chloride, sebacoyl chloride. Most preferably, the diacyl peroxide produced is diisobutanoyl peroxide.

The $M_2O_2$ is preferably prepared by combining hydrogen peroxide and NaOH, KOH, $K_2CO_3$, and/or $Na_2CO_3$. The $M_2O_2$ can be prepared separately or in a reaction step of the present process.

Any peracid used can be prepared in a conventional way. Preferably, a $C_2$–$C_{20}$ peracid is used. It is noted that when a peracid is reacted with acid halide, typically an asymmetrical diacyl peroxide is obtained, meaning that $R^1$ and $R^2$ are not the same as $R^3$ and $R^4$, whereas if a mixture of two different acid halides is reacted with MOOH/$M_2O_2$, a statistical mixture of two symmetrical and one asymmetrical diacyl peroxides is obtained. The use of a peracid allows better control of the polymerization rate, since just one product with a dedicated half-life time is formed. Furthermore, it is noted that if asymmetrical diacyl peroxide is desired of which $R^3$ or $R^4$ is hydrogen, the use of a mixture of acid halides will partially result in the formation of diacyl peroxide that shows no branching on the two α-carbons (relative to the diacyl peroxide function). Such α-carbon unbranched diacyl peroxides are quite stable and part of them will end up in the final polymer, typically resulting in a lower than desired heat stability of the polymer. Hence, it is preferred to use a peracid if it is desired that $R^3$ and/or $R^4$ are hydrogen. More preferably, the peracid is selected from the group consisting of peracetic acid, perpropionic acid, perisobutanoic acid, perhexanoic acid, perbenzoic acid, 3-chloroperbenzoic acid, and perlauric acid, the use of perpropionic acid and perlauric acid being most preferred.

Preferably, the process is conducted such that it is essentially free of solvent, since such solvents are not desired in the final polymer. For the purpose of this specification, essentially solvent-free means that less than 20% w/w of solvent, based on the weight of the diacyl peroxide, is present. Preferably less than 10% w/w, more preferably less than 5% w/w, most preferably less than 2% w/w of solvent is present, all based on the weight of the diacyl peroxide. However, if the use of certain solvents, such as conventional plasticizers for PVC or phlegmatizers for the peroxide, is acceptable in the polymer obtained in the polymerization step, it may be advantageous to use such solvents. Conventional plasticizers include epoxidized soybean oil, dialkyl esters, such as alkyl esters of aliphatic carboxylic acids with two or more carboxylic acid moieties, and less desired phthalate esters. Conventional phlegmatizers include hydrocarbons, such as isododecane.

Preferably, the peroxidation step of the process is conducted without a salt being added to the reaction mixture. However, if so desired, a salt may be added, for instance to increase the yield of diacyl peroxide. If used, the salt is preferably selected from alkali and/or alkaline-earth metals. Preferably, they are salts of strong acids that do not react with $H_2O_2$, peracid, or a salt thereof. More preferably, the salt is selected from NaCl, KCl, $Na_2SO_4$, $K_2SO_4$, and $NH_4Cl$.

If used, the colloids are advantageously selected from the group consisting of hydrolyzed polyvinyl acetate, alkyl cellulose, hydroxyalkyl alkyl cellulose, gelatin, polyvinyl pyrrolidone, polyoxyethylene sorbitan monolaurate, and polyacrylic acid. Preferably, said dispersant is a non-ionic compound. Most preferably, it is a mixture of one or more hydrolyzed polyvinyl acetates (PVA). Suitably, the degree of hydrolysis of the PVA ranges from 50 up to 95%, preferably up to 90%. Preferably, the degree of hydrolysis is at least 55%, more preferably at least 60%, so that the PVA is soluble in the diacyl peroxide-containing mixture. In order to increase the solubility of the PVA, it can be advantageous to add a $C_1$–$C_4$ alcohol, preferably methanol, ethanol, and/or isopropanol.

All conventional surfactants can be used. However, in order not to disturb the dispersion of the polymerization reaction and not to adversely affect the properties of the final polymer, the surfactant preferably is a (biodegradable) cationic compound, such as preferred quaternary ammonium compounds, or a non-ionic surfactant. Preferred conventional non-ionic surfactants include, but are not limited to, alkoxylated (fatty) alcohols and alkoxylated sugars.

The aqueous mixture that results from the peroxidation step can be transferred to the polymerization reactor "as is". However, in order to enhance the safety of handling of the diacyl peroxide, it is preferred to add at least one surfactant and/or colloid, so that a physically stable dispersion of the diacyl peroxide in the aqueous mixture, or a dispersion of the aqueous phase in the diacyl peroxide, is obtained. If need be, the size of the dispersed phase (droplet or particle size) can be reduced in an optional further homogenization step. However, such a step is only a prerequisite when the dispersion as obtained is not safe. Suitably, this is detected by heating a 100 g sample of the dispersion up to a temperature where the diacyl peroxide decomposes. If a certain phase separation is observed, the safety characteristics of the least safe phase are decisive. However, it may also be desired to obtain a very finely dispersed phase, for instance to enhance an even distribution of the diacyl peroxide over the monomer(s) in the polymerization reactor (e.g. to reduce the fish-eye level in PVC that is produced by a suspension polymerization process). If such fine dispersions (with the average size by volume of the dispersed phase being less than 10 μm, preferably less than 5 μm, most preferably less than 2 μm) are of interest, then also an extra homogenization step can be advantageously introduced. The homogenization step can be performed using any suitable (high) shear mixer, such as rotor/stator homogenizers, colloid mills, ultrasonic devices, and the like.

In a preferred embodiment, the diacyl peroxides of this invention are prepared in a feed line, such as a pipe, that is directly connected to the polymerization reactor. The desired (raw) materials for the peroxidation step are then fed into the pipe at suitable points. Optionally, an in-line mixer is then used to homogenize the resulting product of the peroxidation step before it is used in the polymerization step. If so desired, part of the product of the peroxidation step may be recycled in such a set-up to increase the yield of diacyl peroxide. If so desired, the line may be flushed clean with water after the peroxidation step. However, it can also be switched to another polymerization reactor, such that the peroxidation can be an essentially continuous operation.

The product resulting from the peroxidation step typically contains by-products and residual raw materials. Particularly when the diacyl peroxide is prepared using $MOOH/M_2O_2$, a substantial quantity of a salt (MX) is formed. The by-products must not be a hindrance in the polymerization reaction. However, it is known that salts adversely affect the stability of the emulsion of the diacyl peroxide, which is a safety concern, while salts may also adversely affect the electrical properties of the final polymer. Hence, it may be preferred to include a purification step. Depending on safety considerations, it can be acceptable to conduct the peroxidation step without any surfactants and/or colloids being used and then to separate and discard (part of) the water layer, after which the diacyl peroxide-rich organic layer may be dispersed and/or diluted, if so desired, using the appropriate media and/or solvents. If an aqueous diacyl peroxide dispersion is to be achieved, conventional surfactants and/or colloids can be used in the dispersion step. Alternatively, (part of) the salt may be removed using conventional techniques, such as (reverse) osmosis, nanofiltration, ion-exchange, precipitation, and the like. A less preferred process would involve a step wherein a conventional solvent for the diacyl peroxide is added to extract the diacyl peroxide from the mixture.

The process according to the invention is pre-eminently suited to polymerize one or more ethylenically unsaturated monomers, including (meth)acrylic acid (esters), styrene, vinyl acetate, acrylonitrile, vinyl chloride monomer (VCM), and the like. Preferably, the process according to the invention involves the polymerization of monomer mixtures comprising at least 50% w/w of VCM, based on the weight of all monomer(s). In this preferred process, preferred comonomers for use are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes determines to a large extent the molecular weight of the final polymer.

The polymerization process can be conducted as a mass process where the reaction mixture is predominantly monomer(s) or as a suspension process where the reaction mixture typically is a suspension of monomer(s) in water, or as an emulsion or micro-emulsion process where the monomer(s) typically is/are emulsified in water. In these processes the usual additives will have to be used. For example, if the monomer(s) is/are present in the form of a suspension in water, the usual additives such as surfactant(s), protective colloid(s), anti-fouling agent(s), pH-buffer(s), etc. may be present. Depending on the type of polymer desired, each of the abovementioned processes may be preferred. The process according to the invention is especially suited for mass and suspension processes. In the aqueous suspension process to produce PVC from VCM, the polymerization is usually conducted at a temperature in the range of about 0° C. to 100° C. However, for the process of the present invention it is preferred to employ polymerization temperatures of about 40° C. to about 70° C., since this is the temperature at which VCM is polymerized efficiently. The polymerization reaction time may vary from about 1 to about 15 hours, and is preferably from 2 to 6 hours. The aqueous suspension VCM polymerization process in addition to the VCM typically contains water, dispersants, free radical initiator, and optional further ingredients, such as buffers, short stop agents, pre-stabilizers, and the like.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual diacyl peroxide, more preferably less than 40 ppm, and most preferably less than 25 ppm of diacyl peroxide, immediately after drying for 1 hour at 60° C. and screening. The resin was found to exhibit excellent heat stability, as measured with a Metrastat® PSD260 testing oven in accordance with ISO 182-2 (1990E). The improved heat stability proved that the resin hardly discoloured when submitted to melt-processing steps, e.g., to form shaped articles.

The process according to the present invention is pre-eminently suited for combination with polymerization processes as disclosed in WO00/17245. Accordingly, a preferred embodiment of the present invention relates to a process of claim 1 wherein at least part of the diacyl peroxide is dosed to the polymerization mixture at the reaction temperature. More preferably, essentially all of the organic initiator, i.e. diacyl peroxides and, if used, other conventional initiators, dosed in the polymerization process has a half-life of from 0.0001 hour to 1.0 hour at the polymerization temperature, preferably from 0.001 to 0.8 hour, more preferably from 0.002 to 0.5 hour at the polymerization temperature. If the one or more diacyl peroxides are dosed together with other initiators, it is preferred that the diacyl peroxide(s) as well as all other initiators fulfill these half-life requirements. It is noted that half-lives are determined in conventional thermal decomposition studies in monochlorobenzene, as is well-known in the art (see for instance the brochure "Initiators for high polymers" with code 10737 obtainable from Akzo Nobel).

The dosing of the extremely fast initiators to the polymerization reaction mixture can be intermittent or continuous over a period of time wherein at least 20%, preferably at least 40%, more preferably at least 60% of all monomer used in the process is polymerized. If an intermittent operation is selected, there are at least 2, preferably at least 4, more preferably at least 10, and most preferably at least 20 moments at the polymerization temperature at which the initiator is dosed. If so desired, the intermittent and continuous operations may be combined, such that the initiator is dosed intermittently for certain (longer or shorter) periods of time. Most preferably, the diacyl peroxide is dosed continuously and/or intermittently after at least 5%, preferably at least 10%, more preferably at least 20%, most preferably at least 30% of the monomer(s) has already been polymerized and while during the dosing period at least 10%, preferably at least 20%, more preferably at least 30%, and most preferably at least 50% of all monomer used in the process is polymerized.

Preferably, the diacyl peroxide is dosed in a concentration of 0.1 to 60% w/w, more preferably 0.5 to 25% w/w, and most preferably 2 to 15% w/w, based on the weight of the diacyl peroxide-containing mixture, in order to facilitate the even distribution of the diacyl peroxide over the monomer.

The dosing can be effected at any suitable entry point to the reactor. If water is added in the course of the polymerization process, for example to compensate for the shrinkage of the reactor content due to the polymerization reaction, it may be advantageous to use the line through which this water is dosed to also dose the initiator. In a most preferred embodiment, the diacyl peroxide has also been produced in said line.

EXPERIMENTAL

The following chemicals were used in the process to manufacture diacyl peroxides. It is noted that all experiments were performed taking sufficient safety measures. In this respect it is also noted that pure diisobutanoyl peroxide is a detonatable explosive.

Commercially available aqueous $H_2O_2$ with an assay of 69.97% was used. NaOH solution (NaOH-25 and NaOH-33) containing 25% w/w and 33% w/w, respectively, of NaOH was produced from Baker-grade NaOH and distilled water. NaCl solution (NaCl-15 and NaCl-25) containing 15% w/w and 25% w/w, respectively, of NaCl was produced from Baker-grade NaCl and distilled water. $Na_2CO_3$ solution containing 10% w/w of $Na_2CO_3$ was produced from Baker-grade $Na_2CO_3$ and distilled water. HCl solution containing 18% w/w of HCl was produced from Baker-grade HCl and distilled water. Isobutanoyl chloride (99.3%) was supplied by BASF Lauroyl chloride (98%) was supplied by Acros. A fresh PVA solution, 5% w/w Alcotex® 72.5 ex Harco in demineralized water was prepared fresh, 1 day prior to use.

Example 1

For the preparation of isobutanoyl-lauroyl peroxide, a reactor was charged at 0° C. with 35 g deionized water, 286 g NaCl-25 solution, 110 g of $Na_2CO_3$ solution, 39 g NaOH-25 solution, and 32.5 g $H_2O_2$ solution. Then, within 50 minutes 103.0 g isobutanoyl chloride were dosed while maintaining a pH-value of 11.0 with the aid of NaOH-25 solution. The temperature was maintained at 0° C., and meanwhile the contents of the reactor were homogenised. After addition of the total amount of isobutanoyl chloride, the reaction mixture was stirred for another 15 minutes at pH 11.0. Then, the pH was lowered to 10.0 with HCl solution and the temperature was brought to 5° C. Next, 70.5 g lauroyl chloride were dosed over a period of 10 minutes, while maintaining the pH on 10.0 with the aid of NaOH-25 solution. After addition of the total amount of lauroyl chloride, stirring was continued for another 15 minutes.

The reaction mixture was set aside for 30 minutes in order to allow the two-phase system to separate. The aqueous layer was removed (713 g) and the organic peroxide layer was washed with 300 g NaCl-15 solution. Again, the aqueous layer and the organic layer were allowed to separate, in order to facilitate the isolation of the peroxide layer (Isolated yield: 145.0 g).

Analysis of the isolated peroxide layer:
35% diisobutanoyl peroxide
64% isobutanoyl-lauroyl peroxide
<1% dilauroyl peroxide
<0.01% acid chloride Example 2 and Comparative Examples A–D In Example A, the procedure of WO 01/32613 was repeated. First, a solution of $Na_2O_2$ was prepared by combining 108.3 g of demineralized water, 18.5 g of NaOH-33 solution, and 3.7 g of the aqueous $H_2O_2$. A second reactor was charged with 33.3 g of demineralized water, 27.7 g of the PVA solution, and 16.3 g of isobutanoyl chloride while controlling the temperature between 5–10° C. Next, the Na₂O₂ solution was dosed while the system was homogenized. No diisobutanoyl peroxide was obtained and only an aqueous phase formed.

In Example B, the same procedure was followed as in Example A, except that 2-ethylbutyroyl chloride was used instead of the isobutanoyl chloride. Again, no diacyl peroxide was obtained.

In Example C, the same procedure was followed as in Example A, except that 2-ethylhexanoyl chloride was used instead of the isobutanoyl chloride. Again, no diacyl peroxide was obtained. The resulting mixture was milky white, probably because a lot of 2-ethylhexanoic acid was formed which did not all dissolve in the water.

In Example D, the procedure of Example A was modified in that the second reactor was charged with all the water, PVA solution, isobutyroyl chloride, and aqueous $H_2O_2$, and the NaOH-33 solution was then dosed to it at a temperature of 5–10° C. The yield of diisobutanyl peroxide is expected to be less than 20% w/w. In Example 2, a single reactor was charged with 141.5 g of demineralized water, 18.5 g of NaOH-33 solution, 27.7 g of PVA solution, and 3.7 g of the aqueous $H_2O_2$, after which 16.3 g of isobutanoyl chloride were dosed to the contents of the reactor, while maintaining a temperature of 5–10° C. and while homogenizing the contents of the reactor. An emulsion resulted. The yield of diisobutanoyl peroxide was 82% w/w. It is expected that if the emulsion is used within 48 hours in a polymerization reaction, it will show the same polymerization rates for VCM as were observed when using the same amount of a conventional 30% w/w diisobutanoyl peroxide solution in isododecane.

Example 3

The product of Example 2 was stored for 1.5 hours at 5° C. without being stirred. The active oxygen content (a measure of the amount of diacyl peroxide of formula (I)) of the emulsion was reduced by 2.5% and a little phase separation occurred. In Example 3, a reactor was charged with 175 g of demineralized water, 16.4 g of NaOH-33 solution, 43.8 g of NaCl-25 solution, 250.5 g of $Na_2CO_3$ solution, and 4.8 g of the aqueous $H_2O_2$. Then 23.1 g of isobutanoyl chloride was dosed to the contents of the reactor, while maintaining a temperature of 5–10° C. and homogenizing the contents of the reactor. At the end of the reaction the mixture was neutralized to pH=7. Taking sufficient safety measures, the two-phase system was allowed to separate and about 70% by volume of the aqueous phase was removed. To the organic layer and the remainder of the water layer were added 207.2 g of demineralized water, 109.3 g of PVA solution, 13.7 g of methanol, and 21.9 g of an aqueous 0.2% w/w Berol® 08 (non-ionic emulsifier ex Akzo Nobel) solution. A dispersion resulted which was stable for more than 2.5 hours and showed good performance in the polymerization process of VCM. The yield of diisobutanoyl peroxide was 86% on isobutanoyl chloride and 93% on $H_2O_2$.

The invention claimed is:
1. Process comprising the steps of:
producing an aqueous mixture comprising a diacyl peroxide of formula (I)

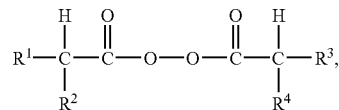

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure, with the further proviso that diacyl peroxides of formula (I) wherein $R^2$ is halogen and $R^4$ is hydrogen, and both $R^1$ and $R^3$ are long chain alkyl groups having about 10 to about 16 carbon atoms, are excluded, by reacting, in a so-called peroxidation step, one or more acid halides of formula

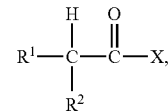

wherein X is halide, preferably chloride or bromide, most preferably chloride, with i) $MOOH/M_2O_2$, wherein M is any metal or ammonium-containing group that will react with $H_2O_2$ to form $MOOH/M_2O_2$ without decomposing one or more of the peroxides present in the process, preferably M is selected from the group consisting of ammonium, sodium, potassium, magnesium, calcium, and lithium, and optionally ii) one or more peracids of formula (III)

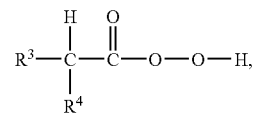

or the M salts thereof, in an aqueous phase, in which process the acid halide, or mixture of acid halides, is essentially only brought into contact with water containing $MOOH/M_2O_2$ and/or one or more peracids or peracid salts, preferably $M_2O_2$ or the M salt of the peracid,
optionally introducing one or more solvents for the acid halide in any part of the process,
optionally introducing one or more salts in any part of the process,
optionally introducing one or more colloids and/or surfactants, before, during, or after the peroxidation step,
optionally purifying the aqueous mixture in one or more purification steps,
optionally homogenizing the aqueous mixture in one or more homogenization steps, transferring the product from the previous steps that comprises the diacyl peroxide of formula (I) to a polymerization reactor, and thermally decomposing said diacyl peroxide, to generate organic free radicals, in the presence of one or more ethylenically unsaturated monomers, to polymerize said monomers in said polymerization reactor.

2. Process comprising the steps of:

producing an aqueous mixture comprising a diacyl peroxide of formula (I)

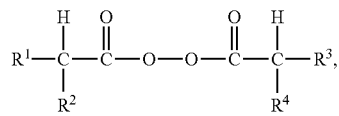

wherein $R^1$–$R^4$ are independently selected from the group consisting of hydrogen, halogen, and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C($R^2$)H and $R^3$—C($R^4$)H represents an, optionally substituted, aromatic ring structure, with the further proviso that if $R^2$ is halogen and $R^4$ is hydrogen, and both $R^1$ and $R^3$ are alkyl groups, then each of these alkyl groups has up to about 6 carbon atoms, by reacting, in a so-called peroxidation step, one or more acid halides of formula (II)

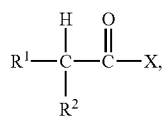

wherein X is halide, preferably chloride or bromide, most preferably chloride, with i) MOOH/$M_2O_2$, wherein M is any metal or ammonium-containing group that will react with $H_2O_2$ to form MOOH/$M_2O_2$ without decomposing one or more of the peroxides present in the process, preferably M is selected from the group consisting of ammonium, sodium, potassium, magnesium, calcium, and lithium, and optionally ii) one or more peracids of formula (III)

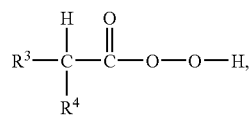

or the M salts thereof, in an aqueous phase, in which process the acid halide, or mixture of acid halides, is essentially only brought into contact with water containing MOOH/$M_2O_2$ and/or one or more peracids or peracid salts, preferably $M_2O_2$ or the M salt of the peracid, optionally introducing one or more solvents for the acid halide in any part of the process, optionally introducing one or more salts in any part of the process, optionally introducing one or more colloids and/or surfactants, before, during, or after the peroxidation step, optionally purifying the aqueous mixture in one or more purification steps, optionally homogenizing the aqueous mixture in one or more homogenization steps, transferring the product from the previous steps that comprises the diacyl peroxide of formula (I) to a polymerization reactor, and thermally decomposing said diacyl peroxide, to generate organic free radicals, in the presence of one or more ethylenically unsaturated monomers, to polymerize said monomers in said polymerization reactor.

3. Process comprising the steps of:

producing an aqueous mixture comprising a diacyl peroxide of formula (I)

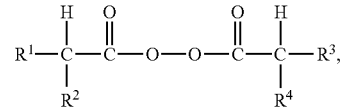

wherein $R^1$–$R^4$ are independently selected from the group consisting of hydrogen and saturated or unsaturated, linear or branched alkyl, alkaryl, and aralkyl moieties optionally substituted with one or more halogen atoms, provided that if $R^1$ and/or $R^2$ are hydrogen, then $R^3$ and/or $R^4$ are not hydrogen and, vice-versa, that if $R^3$ and/or $R^4$ are hydrogen, then $R^1$ and/or $R^2$ are not hydrogen, in which process $R^1$—C—$R^2$ and/or $R^3$—C—$R^4$ can be part of a ring structure that can be saturated or unsaturated and substituted with one or more independently chosen groups $R^1$, or one of $R^1$—C(R)H and $R^3$—C($R^4$)H represents an, optionally substituted, aromatic ring structure, by reacting, in a so-called peroxidation step, one or more acid halides of formula (II)

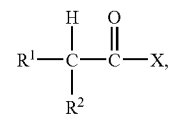

wherein x is halide, preferably chloride or bromide, most preferably chloride, with i) MOOH/$M_2O_2$, wherein M is any metal or ammonium-containing group that will react with $H_2O_2$ to form MOOH/$M_2O_2$ without decomposing one or more of the peroxides present in the process, preferably M is selected from the group consisting of ainmonium, sodium, potassium, magnesium, calcium, and lithium, and/or ii) one or more peracids of formula (III)

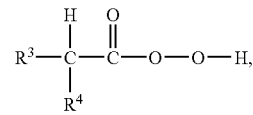

or the M salts thereof, in an aqueous phase, in which process the acid halide, or mixture of acid halides, is essentially only brought into contact with water containing $MOOH/M_2O_2$ and/or one or more peracids or peracid salts, preferably $M_2O_2$ or the M salt of the peracid, optionally introducing one or more solvents for the acid halide in any part of the process, optionally introducing one or more salts in any part of the process, optionally introducing one or more colloids and/or surfactants, before, during, or after the peroxidation step, optionally purifying the aqueous mixture in one or more purification steps, optionally homogenizing the aqueous mixture in one or more homogenization steps, transferring the product from the previous steps that comprises the diacyl peroxide of formula (I) to a polymerization reactor, and thermally decomposing said diacyl peroxide, to generate organic free radicals, in the presence of one or more ethylenically unsaturated monomers, to polymerize said monomers in said polymerization reactor.

4. A process according to claim 1 wherein the diacyl peroxide obtained in the peroxidation step is used in the polymerization process within a period of 168 hours after said peroxidation step.

5. A process according to claim 1 wherein the diacyl peroxide is stored and handled in this process at temperatures up to 5° C.

6. A process according to claim 1 wherein one and the same reactor is used to make the $MOOH/M_2O_2$ from a source of M and $H_2O_2$ and to carry out the peroxidation step.

7. A process according to claim 1 wherein 0.005 to 2% w/w of the diacyl peroxide is used in the polymerization step, based on the weight of the ethylenically unsaturated monomer(s).

8. A process according to claim 1 wherein the ethylenically unsaturated monomer(s) comprise(s) vinyl chloride monomer.

9. A process according to claim 1 wherein at least one acid halide is used that is selected from the group consisting of lauroyl halide, isobutanoyl halide, 2-ethylbutanoyl halide, 2-ethylhexanoyl halide, 2-chloropropanoyl halide, cyclohexane carbonyl halide, 3-methylcyclohexane carbonyl halide, and 2,3-dihalocyclohexane carbonyl halide.

10. A process according to claim 1 wherein at least one resulting diacyl peroxide is asymmetrical.

11. A process according to claim 10 wherein a peracid is used in the peroxidation step.

12. A process according to claim 1 that is essentially solvent-free.

13. A process according to claim 1 wherein the diacyl peroxide is dosed to the polymerization reaction mixture at the reaction temperature.

14. A process according to claim 3 wherein the diacyl peroxide obtained in the peroxidation step is used in the polymerization process within a period of 168 hours after said peroxidation step.

15. A process according to claim 3 wherein the diacyl peroxide is stored and handled in this process at temperatures up to 5° C.

16. A process according to claim 3 wherein one and the same reactor is used to make the $MOOH/M_2O_2$ from a source of M and $H_2O_2$ and to carry out the peroxidation step.

17. A process according to claim 3 wherein 0.005 to 2 % w/w of the diacyl peroxide is used in the polymerization step, based on the weight of the ethylenically unsaturated monomer(s).

18. A process according to claim 3 wherein the ethylenically unsaturated monomer(s) comprise(s) vinyl chloride monomer.

19. A process according to claim 3 wherein at least one acid halide is used that is selected from the group consisting of lauroyl halide, isobutanoyl halide, 2-ethylbutanoyl halide, 2-ethylhexanoyl halide, 2-chloropropanoyl halide, cyclohexane carbonyl halide, 3-methylcyclohexane carbonyl halide, and 2,3-dihalocyclohexane carbonyl halide.

20. A process according to claim 3 wherein at least one resulting diacyl peroxide is asymmetrical.

21. A process according to claim 3 that is essentially solvent-free.

22. A process according to claim 3 wherein the diacyl peroxide is dosed to the polymerization reaction mixture at the reaction temperature.

* * * * *

UNITED STATES PATENT AND TRADEMARK OFFICE
CERTIFICATE OF CORRECTION

PATENT NO.       : 7,087,693 B2
APPLICATION NO.  : 10/503052
DATED            : August 8, 2006
INVENTOR(S)      : Marinus Catharinus Tammer et al.

It is certified that error appears in the above-identified patent and that said Letters Patent is hereby corrected as shown below:

On the Title page, under item [56] "Foreign Application Priority Data", "EP 02075882" should be --EP 02075882.7--.

Column 16, claim 3, lines 37-38, "$R^1$-C(R)H" should be --$R^1$-C($R^2$)H--.

Column 16, claim 3, line 55, "ainmonium" should be --ammonium--

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,087,693 B2 | Page 1 of 1 |
| APPLICATION NO. | : 10/503052 | |
| DATED | : August 8, 2006 | |
| INVENTOR(S) | : Marinus Catharinus Tammer et al. | |

It is certified that error appears in the above-identified patent and that said Letters Patent is hereby corrected as shown below:

On the Title page, under item [56] "Foreign Application Priority Data", "EP 02075882" should be --EP 02075882.7--.

Column 16, claim 3, lines 37-38, "$R^1$-C(R)H" should be --$R^1$-C($R^2$)H--.

Column 16, claim 3, line 55, "ainmonium" should be --ammonium--

This certificate supersedes Certificate of Correction issued December 19, 2006.

Signed and Sealed this

Sixth Day of February, 2007

JON W. DUDAS
*Director of the United States Patent and Trademark Office*